US00RE36879E

United States Patent [19]

Schoell

[11] E Patent Number: Re. 36,879

[45] **Reissued Date of Patent: *Sep. 26, 2000**

[54] PLANING BOAT HULL

[76] Inventor: Harry L. Schoell, 1301 River Dr., Ft. Lauderdale, Fla. 33315

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,812

[22] Filed: Oct. 9, 1997

Related U.S. Patent Documents

Reissue of:

[64] Patent No.: 5,456,202
Issued: Oct. 10, 1995
Appl. No.: 07/596,311
Filed: Oct. 12, 1990

[51] Int. Cl.[7] ..... B63B 1/20

[52] U.S. Cl. ..... 114/291; 114/271

[58] Field of Search ..... 114/56, 271, 291; D12/313, 314

[56] References Cited

U.S. PATENT DOCUMENTS

| | | | |
|---|---|---|---|
| D. 79,534 | 10/1929 | Smith . | |
| D. 220,661 | 5/1971 | Line . | |
| D. 224,275 | 7/1972 | Cole . | |
| D. 234,349 | 2/1975 | Cole . | |
| D. 234,685 | 4/1975 | Cole | D12/314 |
| D. 244,841 | 6/1977 | Nescher . | |
| D. 285,190 | 8/1986 | Pipkorn . | |
| D. 359,941 | 7/1995 | Mannerfelt . | |
| D. 383,109 | 9/1997 | Livingston . | |
| 971,029 | 9/1910 | Fauber . | |
| 1,318,413 | 10/1919 | Ruhe . | |
| 1,536,940 | 5/1925 | Sherburne . | |
| 1,743,907 | 1/1930 | Alderman . | |
| 1,766,360 | 6/1930 | Schipper . | |
| 1,782,320 | 11/1930 | Scott-Paine | 114/291 |
| 1,782,893 | 11/1930 | Greening | 114/291 |
| 2,162,705 | 6/1939 | Diehl . | |
| 2,397,583 | 4/1946 | Nelson . | |
| 2,423,860 | 7/1947 | Van Patten . | |
| 2,634,698 | 4/1953 | Becker . | |
| 2,969,760 | 1/1961 | Eddy . | |
| 3,075,488 | 1/1963 | Wolfe et al. . | |
| 3,091,206 | 5/1963 | Cale . | |
| 3,111,923 | 11/1963 | Eddy . | |
| 3,203,389 | 8/1965 | Cale . | |
| 3,216,389 | 11/1965 | Thorsen . | |
| 3,225,729 | 12/1965 | Ewing, Jr. . | |
| 3,363,598 | 1/1968 | Mortrude . | |
| 3,382,833 | 5/1968 | Wukowitz . | |
| 3,457,064 | 7/1969 | Richardson . | |
| 3,463,109 | 8/1969 | Weiler . | |
| 3,468,282 | 9/1969 | Wintercorn . | |
| 3,469,557 | 9/1969 | Wollard . | |
| 3,568,617 | 3/1971 | Yost . | |
| 3,602,179 | 8/1971 | Cole | D12/314 |
| 3,625,173 | 12/1971 | Mitton . | |
| 3,661,109 | 5/1972 | Weiland | 114/291 |
| 3,763,810 | 10/1973 | Payne . | |
| 3,802,370 | 4/1974 | Collier | 114/291 |
| 3,930,455 | 1/1976 | Bremer | 114/56 |
| 3,974,790 | 8/1976 | Oldenburg . | |
| 3,996,869 | 12/1976 | Hadley . | |
| 4,022,143 | 5/1977 | Krenzler . | |
| 4,027,613 | 6/1977 | Wollard | 114/291 |
| 4,091,761 | 5/1978 | Fehn . | |

(List continued on next page.)

OTHER PUBLICATIONS

Larson 1990 Brochure, Defendant Regal's Motion Exhibit B.

Schoell Drawings—Defendant Regal's Motion Exhibit C.

*Primary Examiner*—Sherman Basinger
*Attorney, Agent, or Firm*—Brooks & Kushman P.C.

[57] ABSTRACT

A planing hull having a conical contour extending from the bow portion to a stern portion having a flat surface on each side of the keel, a wide lip chine having a lip portion, and a transom separating the bow portion and the stern portion creating a step between the bow portion and the stern portion. A flat keel portion extends from the stern to the mid hull transom.

39 Claims, 3 Drawing Sheets

U.S. PATENT DOCUMENTS

| | | | |
|---|---|---|---|
| 4,193,370 | 3/1980 | Schoell | 114/291 |
| 4,231,314 | 11/1980 | Peters | 114/291 |
| 4,233,920 | 11/1980 | Wood et al. . | |
| 4,409,922 | 10/1983 | Mambretti . | |
| 4,528,931 | 7/1985 | Lantz . | |
| 4,619,215 | 10/1986 | Wood et al. . | |
| 4,649,851 | 3/1987 | April . | |
| 4,689,026 | 8/1987 | Small . | |
| 4,702,188 | 10/1987 | Harilainen . | |
| 4,705,085 | 11/1987 | Blee . | |
| 4,748,929 | 6/1988 | Payne . | |
| 4,843,988 | 7/1989 | Clement . | |
| 4,903,626 | 2/1990 | Haines . | |
| 5,111,767 | 5/1992 | Haines . | |
| 5,191,853 | 3/1993 | Adler . | |
| 5,205,334 | 4/1993 | Schoell . | |
| 5,231,949 | 8/1993 | Hadley . | |
| 5,351,641 | 10/1994 | Robson . | |
| 5,443,026 | 8/1995 | Wenstadt et al. . | |
| 5,456,202 | 10/1995 | Schoell . | |
| 5,685,253 | 11/1997 | Alexander, Jr. . | |

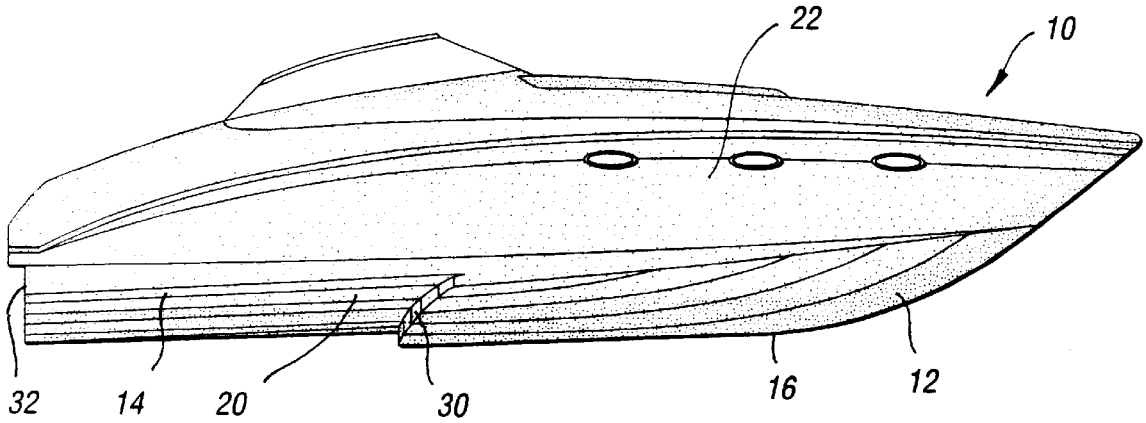
Fig. 1
Fig. 4
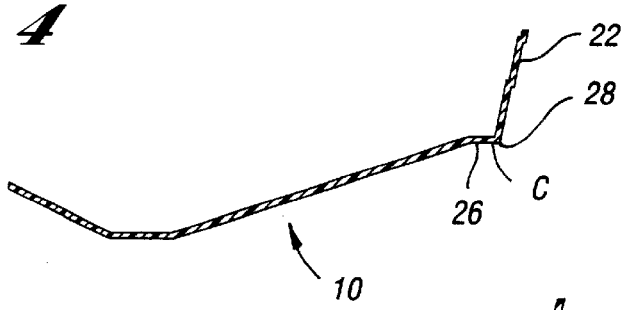
Fig. 5
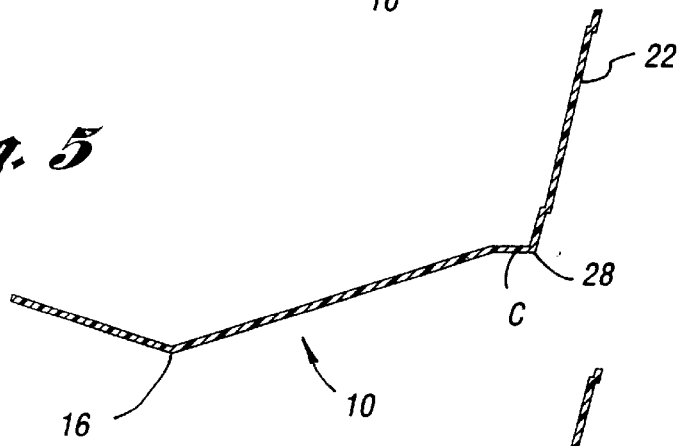
Fig. 6
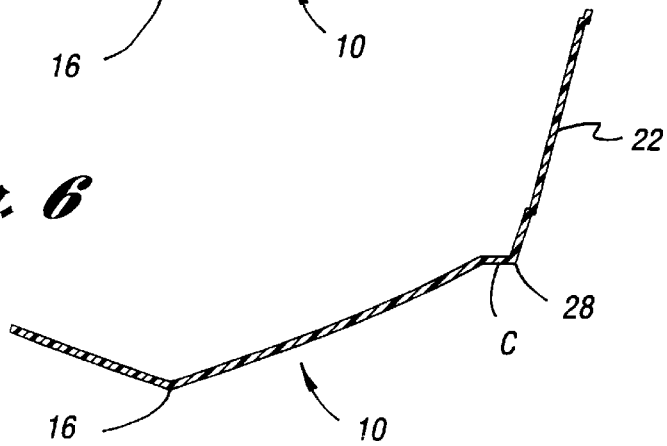

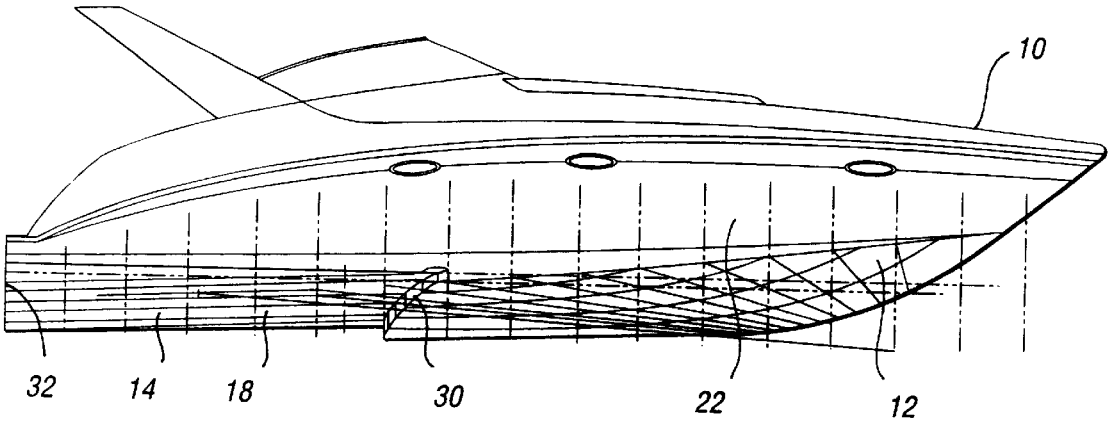
Fig. 2
Fig. 2a
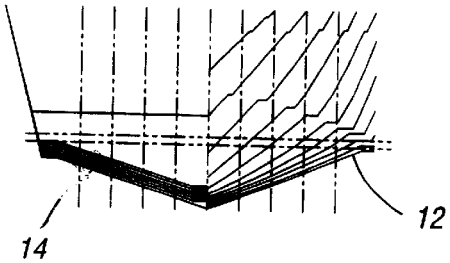
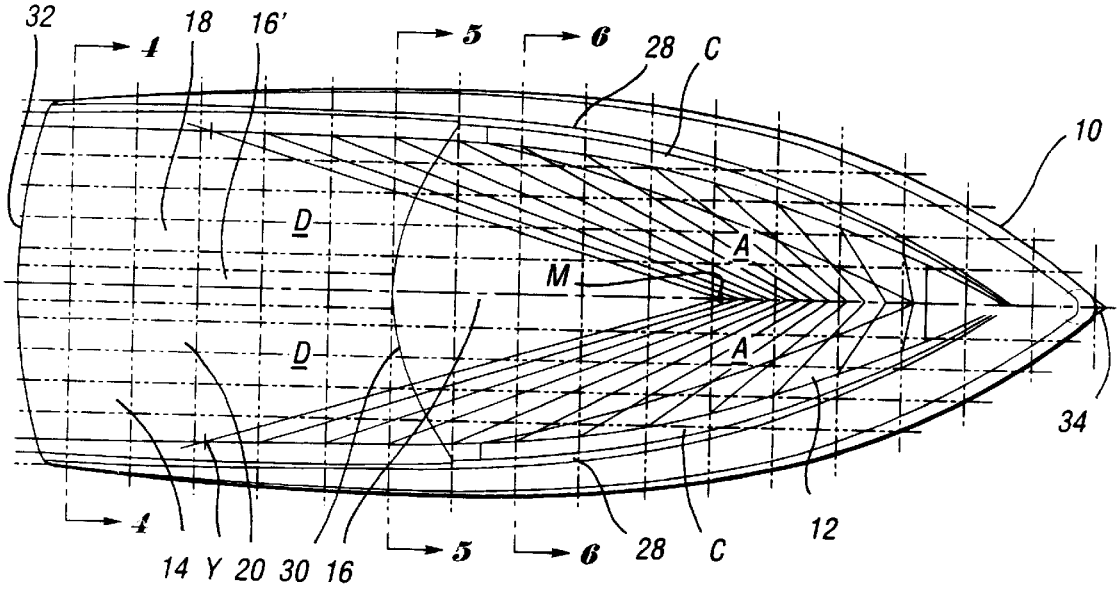
Fig. 3

PLANING BOAT HULL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to hull structures for boats and is more particularly directed to a planing boat hull.

2. Description of the Prior Art

In boating terminology there are two basic hull structures: planing hulls and displacement hulls. A planing hull is one which rides on top of the water, making it fast and maneuverable. A displacement hull on the other hand has more of [it's] *its* hull in the water thereby enhancing stability.

The present invention is concerned with planing boat hulls which have V-type constructions. These hulls have an arcuate contour extending on either side of the keel from the bow to the stern which effect good riding characteristics to the boat when planing, when moving in the direction of a head or following sea and at a speed for which the hull is designed. When a planing boat having a conventional V-hull is not planing or when moving along a quatering sea, [it's] *its* lateral stability is very poor and high impacts of the hull are experienced as the speed of the planing hull is increased. Also, the bow of the boat tends to ride at an increasing angle thereby increasing the water impacts of the hull. Since the water flowing past the boat follows the shape of the hull, the spray created by the forwardly moving boat tends to spray in the direction of the occupants of the boat. U.S. Pat. No. 4,193,370 of the same inventor addresses the poor characteristics of the conventional V-type hulls for planing boats by providing a hull that is partially arcuate and partially flat whose stern is provided with an appropriate dead rise and chines extending about the outer edges of the hull of substantially equal but oppositely extending angle as the dead rise. This present invention is an improvement of U.S. Pat. No. 4,193,370 by including a step arrangement between forward and aftward hulls to lift the boat onto plane without the usual impacts. The aftward hull is designed to "surf" on a bow generated wave at higher speeds due in part to air induced under the hull, which relieves suction loading.

In addition to the inventor's patent cited above, the following U.S. Patents are of interest to the present invention:

U.S. Pat. Des. No. 234,685, issued to Cole

U.S. Pat. No. 2,634,698, issued to Becker

U.S. Pat. No. 3,075,488, issued to Wolfe et al

U.S. Pat. No. 3,225,729, issued to Ewing

U.S. Pat. No. 3,363,598, issued to Mortrude

U.S. Pat. No. 3,930,455, issued to Bremer

U.S. Pat. No. 4,022,143, issued to Krenzler

U.S. Pat. No. 4,233,920, issued to Wood

The above list of patents are divided into two areas of interest concerning the present invention. The first group which includes the Cole, Becker and Ewing patents have step arrangements. Of these, Ewing is of particular interest because of a transom dividing the forward hull section and the aftward hull section. According to the Ewing disclosure the transom flattens out the sea and serves as a planing portion to elevate the forward section of the hull.

The hull design in the Becker patent includes a forward section that is V-shaped and an aftward section that is more of a plane shape. Separating the two sections is a transom or step, whose sole purpose is to define the forward and aftward sections.

The design patent to Cole shows a transom or step separating the forward and aftward sections. The transom is shown as a V-shape with the keel dividing the transom into two parts. A close look at the transom shows that it tapers into the keel at the boat center line.

The second group of patents includes Wolfe et al, Mortrude, Bremer, Krinzler and Wood et al, all of which are directed to flat areas for planing. The flat area in Bremer and Krinzler extend the length of the hull center line below the water, while in Wolfe et al, Mortrude and Wood the flat area extends, at most, from mid hull to the rear transom. The planing pad in Wood is concave to provide stability in high speed turns.

SUMMARY OF THE INVENTION

A principal object of the present invention is to provide a hull for a planing boat with a partially arcuate contour, namely the surface of a cone, and a partially flat portion thereby increasing its lateral stability at non-planing speeds where the hull has a forward section and an aftward section separated by a step arrangement to lift the boat onto plane without having the usual impact.

Another object is to provide a hull of a planing boat with a conical surface extending from the bow on each side of the keel to a position of the boat where flat surfaces extend to the stern on each side of the keel for the remainder of the hull, and a keel extending to the stern between the flat surfaces, said keel being a broad flat surface to lift the boat onto its planing mode.

A further object is to provide a broad flat keel having a width of about ten percent of the boat's beam.

A still further object of the present invention is to provide a hull of a planing boat having a relatively low hull impact at planing speeds in a quartering head or following sea, excellent lateral stability at low and planing speeds, relatively low hull impact at high planing speeds and whose spray is directed away from the hull so as not to wet the occupants of the boat while planing.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE DRAWINGS

FIG. 1 is a perspective view of a planing boat of the invention.

FIG. 2 is a side view of a boat including a hull constructed in accordance with this invention with station lines 0–16 identified along the length of the hull.

FIG. 2*a* is a compilation of views taken along station lines 1–16 of FIG. 2 with sections on the right side including a V-shaped keel and sections on the left illustrating portions of the keel with a flat surface;

FIG. 3 is a bottom plan view.

FIGS. 4 and 5 are views taken along the lines 4—4 and 5—5, respectively of FIG. 3.

FIG. 6 is a view taken along the line 6—6 of FIG. 3.

DESCRIPTION OF THE INVENTION

Figure 7:
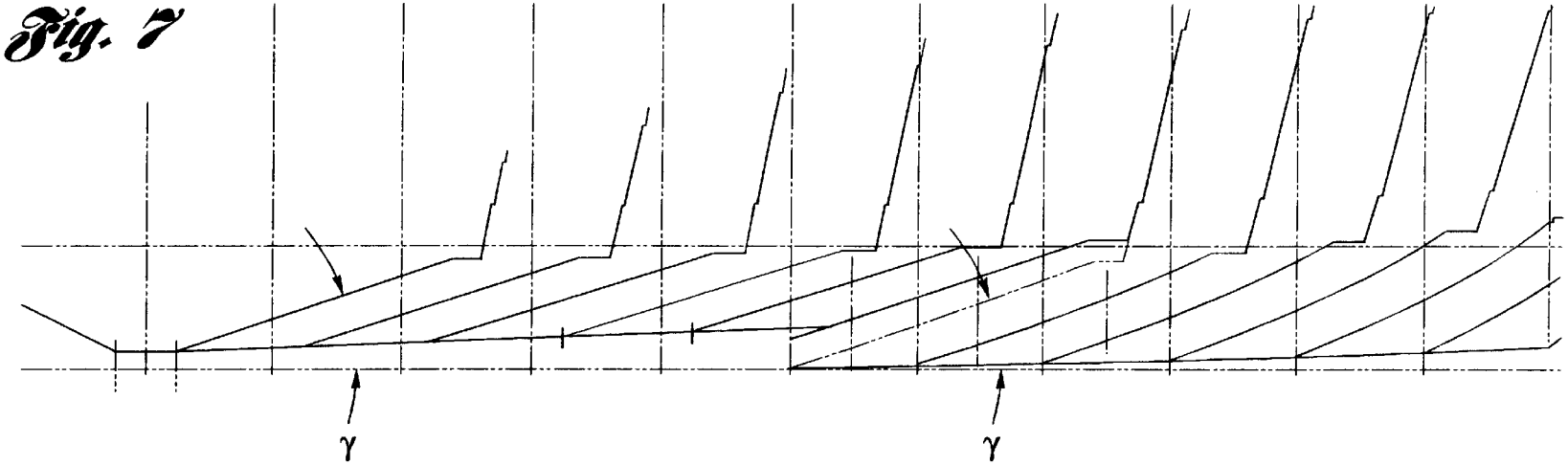
FIG. 7 is a compilation of views taken along station lines 5–16 of FIG. 2 illustrating flat chines and dead rise angles[.]; *and*
Figure 8:
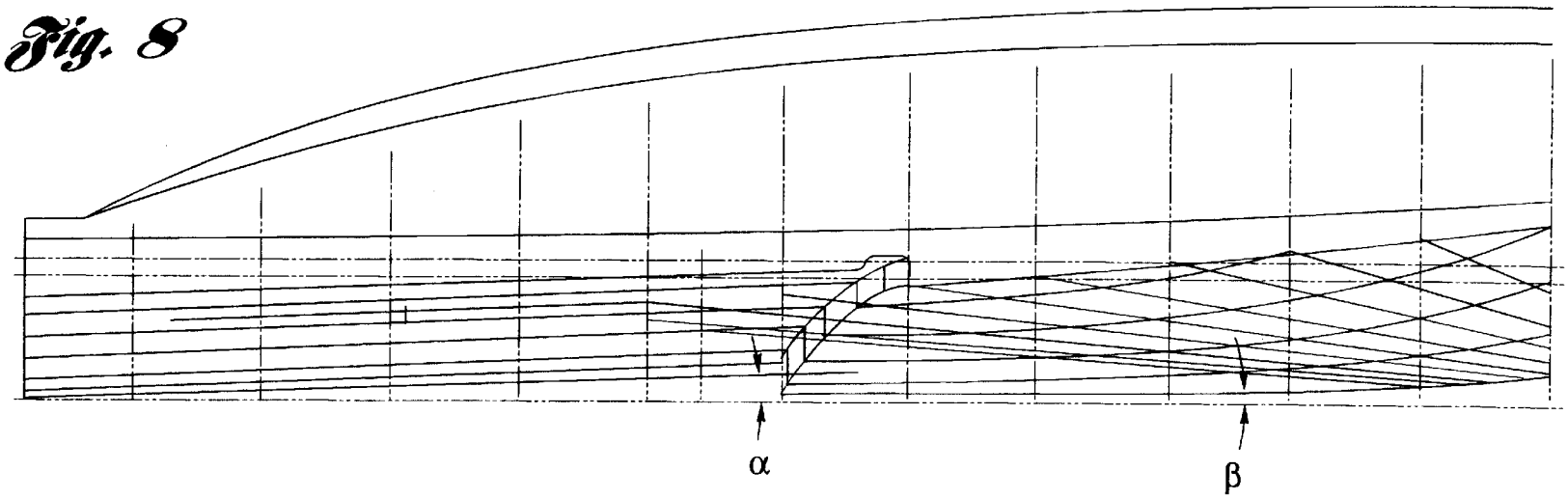
FIG. 8 is a partial side view of the hull from the stern to station line 5 illustrating angles of attack.

Referring to the drawings there is shown in FIGS. 1 and 2 a hull 10 of a planing boat constructed in accordance with the invention and consisting generally of a bow portion 12, a stern portion 14, a keel 16 extending from the bow portion 12 to the stern portion 14, substantially flat and planar bottom hull portions 18 and 20 symmetrically disposed on each side of the keel 16 extending upwardly to a chine portion C whose outer edge portion on each side of the boat hull 10 joins a side hull portion 22 that likewise extends from the bow portion 12 to the stern portion 14.

The bottom hull portions 18 and 20 consist of symmetrically disposed flat planes extending from the keel 16 to the chine portions C and to the rear edge portion of the bottom arcuate bow hull portion 12. The bottom hull portions 18 and 20, known as the delta areas "D", contact the water during the planing of the boat hull 10 to provide the boat hull 10 with a minimum of water resistance and good stability. Bottom hull portions 18 and 20, or delta areas "D", engage the chine portions C at the stern 24 and extend forwardly, for a distance at or about one third of the length of the boat hull 10 as at "Y" where the delta areas "D" engage the bottom hull portion 12 to position M. The bottom bow hull surface 12 is arcuate, namely the curved surface of a cone and called the conic area A.

The description of the conic area A is found in my prior patent U.S. Pat. No. 4,193,370, issued Mar. 18, 1980, and where applicable, said patent is incorporated herein by reference.

The chine portions C are of constant width throughout the length of the boat except at the bow 12 where they taper or converge together as best shown in FIG. 3. The total chine width is approximately one fifth the width of the hull portions 12 and 14 at the beam. The chine portions C extend from the outer edges of the hull portions 12 and 14 in a horizontal planar surface 26, joined at their edge portions by a downwardly inclined chine lip portion 28 extending at the same angle as the dead rise, namely 12 to 18 degrees but in a reverse direction. Chine lip portion 28 forms the bottom edge of the side hull walls 22. By having wide chines C they will assist in dampening the lateral roll of the hull when at rest and will also direct spray away from the hull 10 when underway. The reversely directed chine lip portions 28 with reverse angles of 12–18 degrees tend to direct the water slightly inwardly in a manner so as not to interfere with the optimum performance of the hull and yet tend to keep the water from riding over the chine areas and up the sides of the hull. However, when the boat hull 10 is planing, the chines C will be sufficiently out of the water so that they cannot impact, but will limit the lean entry into the waves, so as not to bury the hull too far into the wave which otherwise would cause the boat to broach. The roundness of the conical areas A also cushions the riding characteristics of the hull 10.

The improved-hull design provides a stepped offset at a mid boat transom 30 which is arcuate as best shown in FIG. 3 and extends from one chine lip portion 28 to the other. The transom 30 is positioned approximately one-third to one-half the length of the hull stern portion 14 and hull bow portion 12. As the hull speed of the hull increases a bow wave is generated. The wave surges under the hull 10, causing the stern portion 14 to ride on the bow wave. In conventional hulls there would be a hump or impact when the hull went up onto plane. However, providing the hull described with a mid-boat transom 30 lifts the hull onto the plane without having to climb over the "hump" and thus avoiding any sudden impact.

Turning to FIGS. 4 and 5, the aftward stern portion 14 has substantially planar portions from the stern 32 to the mid boat transom 30. The dead rise angle [$\alpha$] $\lambda$, as seen in FIG. 7, of hull portions 18 and 20 are the same as the transom 30 and at the stern 32. The dead rise angle of any hull is the angle which the bottom surfaces make with the horizontal. It is the flat planar hull portions 18[,] and 20 which increases the hull's lateral stability at non-planing speeds.

The dead rise angle $\gamma$ on the hull portion 18 and 20 ideally should be generally equal to the dead rise angle $\gamma$ on the planar forward portion on bow portion 12. The angle of attack $\alpha$ on hull portions 18 and 20 should be at 2°–3° and the angle of attack $\beta$ on the delta conic planar forward portion on bow portion 12 should be equal to that of $\alpha$ (such that the hull portions 18 and 20 are parallel to the conic planar forward portions) or possibly up to 1° greater.

A substantially flat or concaved keel portion 16' extends from the mid-boat transom 30 to the stern 32, best shown in FIGS. 3 and 4. The length of the keel portion 16' is approximately between 30–50 percent of the overall length of the hull from the bow 34 to the stern 32. The balance of the keel 16 is the apex of the V-shape of the bow portion 12, keeping in mind that the keel, which is the backbone of any good planing hull, is one integral member extending from the bow to the stern. The width of the flat or concaved keel portion 16' is about 10 percent of the width or beam of the hull to provide a surface to ride the bow waves, much like a water ski or a surf board. Once on plane, the forward and aft hull portions 12 and 14, respectively, riding at their optimum planing angle and the hull, surfs on the bow wave at higher speeds. This is aided by the described hull design having a transom 30 which induces air under the hull as the hull reaches planing speed, relieving suction.

The hull 10 has parallel lateral strakes, not shown, which run along the bow portion 12 to the mid hull transom 30 and from behind the transom-step 30 to the stern 32. The number of strakes may vary according to the hull length and beam.

In operation, the hull 10 with a unique duo-delta conical hull portion 12 having a conical entry, a delta constant planing stern portion 14 and wide lip chines C displaces a delta pattern in the water when on plane. The bow portion creates a bow wave which is forced or surges under the hull 10, causing the stern portion 14 to ride this wave. The mid-hull transom 30 relieves the normal "hump" or impact when the hull climbs this bow wave lifting the boat onto plane.

As the boat reaches its plane, air is induced under the hull 10 via the mid-hull transom 30 and the shape of the bow portion 12. This induced air relieves any cavitation, suction or other phenomena which causes friction and drag on the hull. The arcuately shaped transom 30 enhances the induced air across the entire stern portion 14 enabling smoother and faster "lifting" onto plane without the impact of other hull designs.

Once on plane, the hull 10 is capable of riding the bow wave using the flat or concaved keel portion 16' to surf on the wave, making the boat extremely maneuverable on hard turns with a wide open throttle.

While only one embodiment of the invention has been disclosed, other embodiments may become apparent to those skilled in the art, therefore one should study the drawings, description and claims for a full understanding of the invention.

I claim:

1. A planing boat hull for planing upon a water surface, the boat hull comprising:

an upper hull, a lower hull, and a pair of laterally spaced chine portions connecting therebetween;

the lower hull including a forward hull and an aft hull and a stepped offset extending transversely therebetween;

the forward hull including an arcuate bow, a V-shaped keel extending from the bow to the stepped offset, and two generally planar forward planing portions extending symmetrically outboard from the V-shaped keel of the forward hull toward the respective chine portions and extending aftward from an apex adjacent the arcuate bow to the stepped offset; and the aft hull including a stern and a generally flat aft keel extending from the offset to the stern and a pair of generally planar aft planing portions extending symmetrically outboard from the aft keel toward the chine portions and aftward from the offset to the stern;

the stepped offset connecting the forward planing portions to the aft keel and the aft planing portions;

wherein during planing of the hull, the hull planes on the water surface upon the forward planing portions and the aft keel and aft planing portions.

2. The planing boat hull of claim 1 wherein:

each of the generally planar forward planing portions and each of the generally planar aft planing portions have an acute angle of attack and an acute dead rise angle; and the angle of attack and dead rise angle on each of the generally planar forward planing portions and each of the generally planar aft planing portions are substantially equal.

3. The planing boat hull of claim 2 wherein:

the angle of attack is between 2–3 degrees.

4. The planing boat hull of claim 1 wherein:

each of the generally planar forward planing portions and each of the generally planar aft planing portions have an acute angle of attack and an acute dead rise angle; and the angle of attack on the forward planing portions is between 0–1 degrees greater than the angle of attack of the aft planing portions.

5. The planing boat hull of claim 4 wherein:

the angle of attack on each of the aft planing portions is between 2–3 degrees.

6. The planing boat hull of claim 1 wherein:

the generally planar forward planing portions and the generally planar aft planing portions are parallel to one another.

7. The planing boat hull of claim 1 wherein:

the generally planar aft planing portions extend outboard from the aft keel to the respective chine portions.

8. The planing boat hull of claim 7 wherein:

the width of the aft keel is narrower than either of the planar aft planing portions.

9. The planing boat hull of claim 1 wherein:

the hull has a maximum beam width and the width of the generally flat aft keel is approximately 10% of the maximum beam width.

10. The planing boat hull of claim 1 wherein:

the aft keel is slightly concave.

11. The planing boat hull of claim 1 wherein:

the overall width of each of the chine portions at the maximum beam width of the hull is approximately 10% of the width of the forward hull and the aft hull at the maximum beam width.

12. The planing boat hull of claim 1 wherein:

the stepped offset is arcuate extending from one of the chine portions to the other of the chine portions.

13. The planing boat hull of claim 12 wherein:

the stepped offset curves forwardly from the aft keel to each of the chine portions thereby funneling air beneath the hull during planing and reducing suction on the hull.

14. The planing boat hull of claim 1 wherein:

the length of the aft keel is 30–50% the length of the entire hull.

15. The planing boat hull of claim 1 wherein:

the arcuate bow is at least partially conical.

16. The planing boat hull of claim 1 wherein:

chine portions extend generally horizontally.

17. The planing boat hull for planing upon a water surface, the boat hull comprising:

an upper hull, a lower hull, and a pair of laterally spaced and generally horizontally extending chine portions connecting therebetween;

the lower hull including a forward hull and an aft hull and a stepped offset extending transversely therebetween;

the forward hull including an arcuate bow which is at least partially conical in shape and a V-shaped forward keel trailing therefrom with two generally planar planing portions extending symmetrically outboard from the forward keel toward the respective chine portions and extending aftward from an apex adjacent the arcuate bow to the stepped offset;

the aft hull including a stern, a generally flat aft keel extending from the stepped offset to the stern and a pair of generally planar aft planing portions extending symmetrically outboard from the aft keel to the respective chine portions;

the offset curving forwardly from the aft keel to each of the chine portions thereby funneling air rearwardly beneath the hull during planing to reduce suction on the hull;

the hull having a maximum beam width and the width of the aft keel is generally 10% of the maximum beam width and the length of the aft keel is 30–50% the length of the entire hull;

the aft planar portions having an angle of attack between 2–3 degrees and the forward planing portions having an angle of attack 0–1 degrees greater than the aft planing portions, each of the aft portions and forward planing portions having substantially equal dead rise angles;

wherein when the hull is moving forward across the water surface, the forward hull creates a bow wave which surges under the hull causing the aft keel to ride on the bow wave, and when the hull reaches planing speed, the bow wave moves aft, smoothly lifting the aft hull onto plane on the aft keel and aft planing portions.

*18. A planing boat hull for planing upon a water surface, the boat hull comprising:*

*an upper hull, a lower hull, and a pair of laterally spaced chine portions connecting therebetween;*

*the lower hull including a forward hull and an aft hull and a stepped offset extending transversely therebetween toward a respective chine portion;*

*the forward hull including an arcuate bow, a V-shaped forward keel having a first configuration extending from the bow to the stepped offset, and two generally planar forward planing portions extending symmetrically outboard from the V-shaped forward keel of the forward hull toward the respective chine portions and extending aftward from an apex adjacent the arcuate bow to the stepped offset; and*

*the aft hull including a stern and an aft keel having a second configuration different from the first configuration of said forward keel so that it is dicontinuous therewith and extending from the offset to the stern and a pair of generally planar aft planing portions extending symmetrically outboard from the aft keel toward the chine portions and aftward from the offset to the stern;*

*the stepped offset connecting the forward planing portions to the aft keel and the aft planing portions;*

*each of the generally planar forward planing portions and each of the generally planar aft planing portions having substantially equal angles of attack;*

*wherein during planing of the hull, the hull planes on the water surface upon the forward planing portions and the aft keel and aft planing portions and sufficient air is induced under the lower hull from beneath the chine portions via the stepped offset to relieve friction and drag on the hull.*

*19. A planing boat hull for planing upon a water surface, the boat hull comprising:*

*an upper hull, a lower hull, and a pair of laterally spaced chine portions connecting therebetween;*

*the lower hull including a forward hull and an aft hull and a stepped offset extending transversely therebetween toward a respective chine portion;*

*the forward hull including an arcuate bow, a V-shaped keel extending from the bow to the stepped offset, and two generally planar forward planing portions extending symmetrically outboard from the V-shaped keel of the forward hull toward the respective chine portions and extending aftward from an apex adjacent the arcuate bow to the stepped offset; and*

*the aft hull including a stern and an aft keel extending from the offset to the stern and a pair of generally planar aft planing portions extending symmetrically outboard from the aft keel toward the chine portions and aftward from the offset to the stern;*

*the stepped offset connecting the forward planing portions to the aft keel and the aft planing portions;*

*wherein during planing of the hull, the hull planes on the water surface upon the forward planing portions and the aft keel and aft planing portions and sufficient air is induced under the lower hull from beneath the chine portions via the stepped offset to relieve friction and drag on the hull.*

*20. A planing boat hull for planing upon a water surface, the boat hull comprising:*

*an upper hull, a lower hull, and a pair of laterally spaced chine portions connecting therebetween;*

*the lower hull including a forward hull and an aft hull and a stepped offset extending transversely therebetween toward a respective chine portion;*

*the forward hull including an arcuate bow, a V-shaped keel extending from the bow to the stepped offset, and two generally planar forward planing portions extending symmetrically outboard from the keel of the forward hull toward the respective chine portions and extending aftward from an apex adjacent the arcuate bow to the stepped offset to form a delta portion on one side of the offset; and*

*the aft hull including a stern and an aft keel extending from the offset to the stern and a pair of generally planar aft planing portions extending symmetrically outboard from the aft keel toward the chine portions and aftward from the offset to the stern to form a continuation of the delta portion on the other side of the offset;*

*the stepped offset connecting the forward planing portions to the aft keel and the aft planing portions;*

*wherein during planing of the hull, the hull planes on the water surface upon the forward planing portions and the aft keel and aft planing portions and sufficient air is induced under the lower hull beneath the chine portions via the stepped offset to relieve friction and drag on the hull.*

*21. A planing boat hull for planing upon a water surface, the boat hull comprising:*

*an upper hull, a lower hull, and a pair of laterally spaced chine portions connecting therebetween;*

*the lower hull including a forward hull and an aft hull and a stepped offset extending transversely therebetween;*

*the forward hull including an arcuate bow, a V-shaped keel extending from the bow to the stepped offset, and two generally planar forward planing portions extending symmetrically outboard from the V-shaped keel of the forward hull toward the respective chine portions and extending aftward from an apex adjacent the arcuate bow to the stepped offset; and*

*the aft hull including a stern and a generally flat aft keel extending from the offset to the stern and a pair of generally planar aft planing portions extending symmetrically outboard from the aft keel toward the chine portions and aftward from the offset to the stern;*

*the stepped offset connecting the forward planing portions to the aft keel and the aft planing portions;*

*wherein during planing of the hull, the hull planes on the water surface upon the forward planing portions and the aft keel and aft planing portions, and wherein the generally planar forward planing portions and the generally planar aft planing portions are parallel to one another.*

*22. A planing boat hull for planing upon a water surface, the boat hull comprising:*

*an upper hull, a lower hull, and a pair of laterally spaced chine portions connecting therebetween;*

*the lower hull including a forward hull and an aft hull and a stepped offset extending transversely therebetween;*

*the forward hull including an arcuate bow, a V-shaped keel extending from the bow to the stepped offset, and two generally planar forward planing portions extending symmetrically outboard from the V-shaped keel of the forward hull toward the respective chine portions and extending aftward from an apex adjacent the arcuate bow to the stepped offset; and*

*the aft hull including a stern and a generally flat aft keel extending from the offset to the stern and a pair of generally planar aft planing portions extending symmetrically outboard from the aft keel toward the chine portions and aftward from the offset to the stern;*

*the stepped offset connecting the forward planing portions to the aft keel and the aft planing portions;*

*wherein during planing of the hull, the hull planes on the water surface upon the forward planing portions and the aft keel and aft planing portions, and wherein the stepped offset is arcuate extending from one of the chine portions to the other of the chine portions.*

*23. A planing boat hull for planing upon a water surface, the boat hull comprising:*

*an upper hull, a lower hull, and a pair of laterally spaced chine portions connecting therebetween;*

*the lower hull including a forward hull and an aft hull and a stepped offset extending transversely therebetween;*

*the forward hull including an arcuate bow, a V-shaped keel extending from the bow to the stepped offset, and two generally planar forward planing portions extending symmetrically outboard from the V-shaped keel of the forward hull toward the respective chine portions and extending aftward from an apex adjacent the arcuate bow to the stepped offset; and*

*the aft hull including a stern and a generally flat aft keel extending from the offset to the stern and a pair of generally planar aft planing portions extending symmetrically outboard from the aft keel toward the chine portions and aftward from the offset to the stern;*

*the stepped offset connecting the forward planing portions to the aft keel and the aft planing portions;*

*wherein during planing of the hull, the hull planes on the water surface upon the forward planing portions and the aft keel and aft planing portions, and wherein the stepped offset is arcuate extending from one of the chine portions to the other of the chine portions, and the stepped offset curves forwardly from the aft keel to each of the chine portions thereby funneling air beneath the hull during planing and reducing suction on the hull.*

*24. A planing boat hull for planing upon a water surface, the boat hull comprising:*

*an upper hull, a lower hull, and a pair of laterally spaced chine portions connecting therebetween;*

*the lower hull including a forward hull and an aft hull and a stepped offset extending transversely therebetween;*

*the forward hull including an arcuate bow, a V-shaped keel extending from the bow to the stepped offset, and two generally planar forward planing portions extending symmetrically outboard from the V-shaped keel of the forward hull toward the respective chine portions and extending aftward from an apex adjacent the arcuate bow to the stepped offset; and*

*the aft hull including a stern and a generally flat aft keel extending from the offset to the stern and a pair of generally planar aft planing portions extending symmetrically outboard from the aft keel toward the chine portions and aftward from the offset to the stern;*

*the stepped offset connecting the forward planing portions to the aft keel and the aft planing portions;*

*wherein during planing of the hull, the hull planes on the water surface upon the forward planing portions and the aft keel and aft planing portions, and wherein the arcuate bow is at least partially conical.*

*25. A planing boat hull for planing upon a water surface, the boat hull comprising:*

*an upper hull, a lower hull, and a pair of laterally spaced chine portions connecting therebetween;*

*the lower hull including a forward hull and an aft hull and a stepped offset extending transversely therebetween toward a respective chine portion;*

*the forward hull including an arcuate bow portion, a generally V-shaped keel extending from the bow to the stepped offset, and two generally planar forward planing portions extending symmetrically outboard from the keel of the forward hull toward the respective chine portions and aftward to the stepped offset; and*

*the aft hull including a stern and an aft keel extending from the offset toward the stern and a pair of generally planar aft planing portions extending symmetrically outboard from the aft keel toward the chine portions and aftward from the offset toward the stern;*

*the stepped offset connecting the forward planing portions to the aft keel and the aft planing portions;*

*wherein during planing of the hull, the hull planes on the water surface upon the forward planing portions and the aft keel and aft planing portions.*

*26. The planing boat hull of claim 25 wherein:*

*each of the generally planar forward planing portions and each of the generally planar aft planing portions have an acute angle of attack and an acute dead rise angle; and*

*the angle of attack and dead rise angle on each of the generally planar forward planing portions and each of the generally planar aft planing portions are substantially equal.*

*27. The planing boat hull of claim 26 wherein:*

*the angle of attack is between 2–3 degrees.*

*28. The planing boat hull of claim 25 wherein:*

*each of the generally planar forward planing portions and each of the generally planar aft planing portions have an acute angle of attack and an acute dead rise angle; and*

*the angle of attack on the forward planing portions is between 0–1 degrees greater than the angle of attack of the aft planing portions.*

*29. The planing boat hull of claim 28 wherein:*

*the angle of attack on each of the aft planing portions is between 2–3 degrees.*

*30. The planing boat hull of claim 25 wherein:*

*the generally planar forward planing portions and the generally planar aft planing portions are parallel to one another.*

*31. The planing boat hull of claim 25 wherein:*

*the generally planar aft planing portions extend outboard from the aft keel to the respective chine portions.*

*32. The planing boat hull of claim 25 wherein:*

*the width of the aft keel is narrower than either of the planar aft planing portions.*

*33. The planing boat hull of claim 25 wherein:*

*the hull has a maximum beam width and the width of the aft keel is approximately 10% of the maximum beam width.*

*34. The planing boat hull of claim 33 wherein:*

*the overall width of each of the chine portions at the maximum beam width of the hull is approximately 10% of the width of the forward hull and the aft hull at the maximum beam width.*

*35. The planing boat hull of claim 25 wherein:*

*the stepped offset is arcuate extending from one of the chine portions to the other of the chine portions.*

*36. The planing boat hull of claim 35 wherein:*

*the stepped offset extends forwardly from the aft keel to each of the chine portions thereby funneling air beneath the hull during planing and reducing suction on the hull.*

*37. The planing boat hull of claim 25 wherein:*

*the length of the aft keel is 30–50% the length of the entire hull.*

*38. The planing boat hull of claim 25 wherein:*

*the arcuate bow portion is at least partially conical.*

*39. The planing boat hull of claim 25 wherein:*

*chine portions extend generally horizontally.*

* * * * *

UNITED STATES PATENT AND TRADEMARK OFFICE

CERTIFICATE OF CORRECTION

PATENT NO. : RE 36,879
DATED : September 26, 2000
INVENTOR(S) : Harry L. Schoell It is certified that error appears in the above-identified patent and that said Letters Patent is hereby corrected as shown below:

Title page,
Item [60] should read --

Application Serial No. 09/578,073 was filed May 23, 2000 as a continuation of Application Serial No. 08/947,812, now Reissue Patent No. RE. 36,879, which is a reissue of Serial No. 07/596,311, filed October 12, 1990, now patent 5,456,202. --

Signed and Sealed this

Second Day of October, 2001

*Attest:*

Nicholas P. Godici

NICHOLAS P. GODICI
*Acting Director of the United States Patent and Trademark Office*

*Attesting Officer*